United States Patent
Boctor et al.

(10) Patent No.: US 8,352,558 B2
(45) Date of Patent: Jan. 8, 2013

(54) TRANSPORT HIGH AVAILABILITY VIA ACKNOWLEDGE MANAGEMENT

(75) Inventors: Victor Boctor, Redmond, WA (US);
Todd C. Luttinen, Redmond, WA (US);
Jeffrey B. Kay, Bellevue, WA (US);
Jesse M. Dougherty, Bothell, WA (US);
Malcom Pearson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 12/368,312

(22) Filed: Feb. 10, 2009

(65) Prior Publication Data
US 2010/0205257 A1      Aug. 12, 2010

(51) Int. Cl.
*G06F 15/16* (2006.01)
(52) U.S. Cl. ........................ 709/206; 709/203
(58) Field of Classification Search .................. 709/206, 709/203
See application file for complete search history.

(56) References Cited

U.S. PATENT DOCUMENTS

| | | | |
|---|---|---|---|
| 6,477,590 B1 | 11/2002 | Habusha et al. | |
| 6,622,172 B1* | 9/2003 | Tam | 709/232 |
| 7,058,687 B2 | 6/2006 | Kucherawy | |
| 2003/0149715 A1* | 8/2003 | Ruutu et al. | 709/100 |
| 2004/0192312 A1* | 9/2004 | Li et al. | 455/445 |
| 2005/0015455 A1* | 1/2005 | Liu | 709/207 |
| 2006/0059256 A1* | 3/2006 | Kakani | 709/224 |
| 2006/0135072 A1* | 6/2006 | Kasher et al. | 455/67.11 |
| 2008/0082409 A1 | 4/2008 | Huynh | |
| 2008/0298233 A1* | 12/2008 | Arora et al. | 370/229 |
| 2009/0172119 A1* | 7/2009 | Eriksson | 709/206 |
| 2010/0191810 A1* | 7/2010 | Boctor et al. | 709/206 |

OTHER PUBLICATIONS

Border, et al."Performance Enhancing Proxies", Retrieved at<<http://www.ietf.org/proceedings/00jul/I-D/pilc-pep-03.txt>>, Jul. 14, 2000.
"Acknowledgement Messages in IBM MQ Series", Retrieved at<<http://gurubits.wordpress.com/2007/05/30/ acknowledgement-messages-in-ibm-mq-series-websphere-mq/>>, May 30, 2007.
Li, et al."Resisting Spam Delivery by TCP Damping", Retrieved at<<ftp://ftp.research.microsoft.com/Users/joshuago/papers-2004/191.pdf>>.
Fall, et al."Custody Transfer for Reliable Delivery in Delay Tolerant Networks ", Retrieved at<<http://www.cs.ucsb.edu/~ebelding/courses/595/s04_dtn/papers/Fall_Custody.pdf>>.

* cited by examiner

*Primary Examiner* — Duyen Doan

(57) ABSTRACT

Architecture that facilitates transport high availability for messaging services by providing the ability of a receiving entity (e.g., receiving message transfer agent (MTA)) to detect if a sending entity (e.g., sending MTA or client) is a legacy sending entity. When the receiving entity detects that the sending entity is a legacy system, by advertising transport high availability capability to the sending entity, if the sending entity does not opt-in to this capability, the receiving entity keeps the sending entity client "on hold", that is, waiting for an acknowledgement (ACK) until the receiving entity delivers the message to the next hops (immediate destinations). This approach maintains at least two copies of the message until the message is successfully delivered (to the next hop(s)). Hence, if the legacy sending entity or the receiving entity fails, the message is still delivered successfully.

17 Claims, 10 Drawing Sheets

TRANSPORT HIGH AVAILABILITY VIA ACKNOWLEDGE MANAGEMENT

BACKGROUND

Messaging transport servers such as email servers typically receive, store, and forward messages to the subsequent server(s) in the communications pathway to the final destination. In such cases, multiple high availability approaches can be deployed to ensure that the messages exist on at least two transport servers in order to be resilient against hardware and/or software failures.

However, it is oftentimes the case where software updates are provided by the vendor and customers do not always update to the latest version and associated capabilities due to limited resources, for example. In other words, high availability for message transfer agents can be provided in a later version of the messaging server, yet earlier (or legacy) server versions lack the capability to interact with all of the high availability capabilities of the updated server versions.

When receiving a message submission from a client or server over standard protocols (e.g., SMTP-simple message transfer protocol), the transport is supposed to ensure that delivery will be completed before the receiving server accepts responsibility for the message. This generally applies to any inbound sessions over which messages are received from anonymous servers. Hence, customers need to be provided a way to use legacy systems with updated versions of messaging entities in order to provide resilient message redundancy.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates transport high availability for legacy messaging services by providing the ability of a receiving entity to detect if a sending entity is a legacy sending entity. The entities can be clients and/or severs. The receiving entity (e.g., server) advertises the capability for transport high availability. The receiving transport recognizes that the sending entity is legacy or does not want to participate in transport high availability by the fact that the sending entity did not opt-in to high availability, and hence, delayed acknowledgment is employed. When the receiving entity detects that the sending entity is a legacy system, the receiving entity keeps the sending entity client "on hold" and waiting for an acknowledgement until the receiving entity delivers the message to the next hops (immediate destinations). This approach maintains at least two copies of the message until the message is successfully delivered (to the next hop(s)). Hence, if the legacy sending entity or the receiving entity fails, the message is still delivered successfully. In one implementation, ownership (sending the delayed acknowledgement) of a message is not taken until the message is delivered to all next hops.

Administrators can manage the level of redundancy by tuning the amount of time before which a receiving entity (e.g., a receiving message transfer agent) accepts responsibility for the message. That is, tuning is performed such that most of the messages will be delivered below the threshold where the clients time out. This can be a time duration (e.g., seconds) where a history of successful message delivery indicates that a percentage of the messages will be successfully delivered. Alternatively, the time duration can be set to a high value where the sending entity (e.g., also called a client) will timeout and re-send at a later time.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
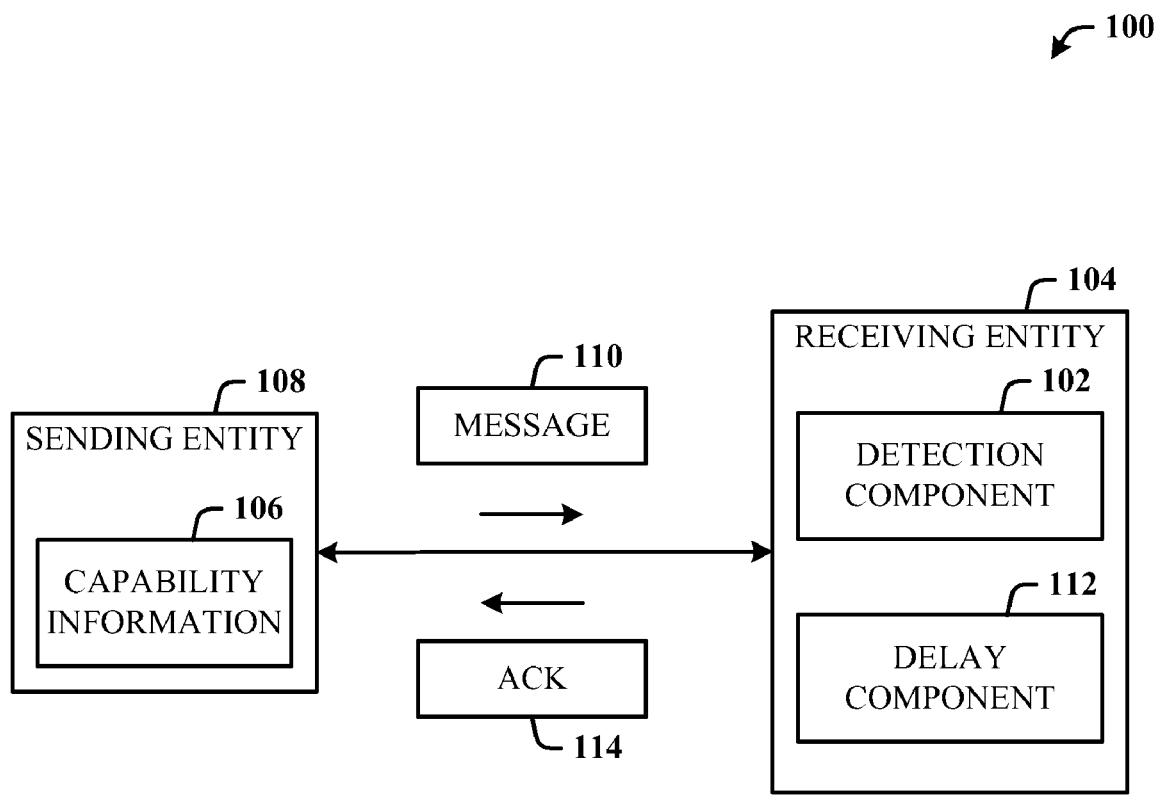
FIG. 1 illustrates a computer-implemented messaging system in accordance with the disclosed architecture.

The disclosed architecture facilitates transport high availability for legacy messaging services by providing the ability of a receiving entity (e.g., receiving message transfer agent (MTA)) to detect if a sending entity (e.g., sending MTA) is a legacy sending entity. When the receiving entity detects that the sending entity is a legacy system, the receiving entity keeps the sending entity client "on hold", that is, waiting for an acknowledgement (ACK) until the receiving entity delivers the message to the next hops (immediate destinations). This approach maintains at least two copies of the message until the message is successfully delivered (to the next hop(s)). Hence, if the legacy sending entity or the receiving entity fails, the message is still delivered successfully.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented messaging system 100 in accordance with the disclosed architecture. The system 100 includes a detection component 102 of a receiving entity 104 for detecting capability information 106 of a sending entity 108 from which a message 110 has been received at the receiving entity 104. This "detection" is in the sense that the sending entity 108 opts-in to a high availability mode offered by the receiving entity 104. The system 100 also includes a delay component 112 for delaying transmission of an acknowledgement (ACK) 114 from the receiving entity 104 to the sending entity 108 based on the capability information 106. The receiving entity 104 (e.g., server) advertises the capability for transport high availability. The receiving entity 104 recognizes that the sending entity 108 is legacy or does not want to participate in transport high availability by the fact that the sending entity 108 did not opt-in to high availability, and hence, delayed acknowledgment is employed.

The acknowledgement 114 is an indication to the sending entity 108 that the receiving entity 104 has assumed ownership of the message 110. Receipt of the delayed acknowledgement 114 causes the sending entity 108 to delete its copy of the message 110. Thus, there are no longer two copies. However, there can be the instance where there are three copies at the point of acknowledgement: at the sending transport, receiving transport, and the next hop.

In other words, optimally, the delayed acknowledgement 114 can indicate that the message 110 was received by the receiving entity 104 and delivered to the next hops. Alternatively, the delivery occurs after the delayed acknowledgement 114 times out but before the sending entity 108 times out. Still alternatively, delivery can occur after the sending entity 108 items out. These situations are described in greater detail herein below.

The capability information 106 can be hardware and/or software capabilities of the sending entity 108. In one particular implementation (using SMTP-simple mail transfer protocol), the receiving entity 104 advertises transport high availability and the sending entity 108 can opt-in to the features (transport high availability). If the sending entity 108 does not opt-in, the receiving entity employs delayed acknowledgement.

In this illustration, the sending entity 108 is a legacy entity relative to the receiving entity 104 (e.g., updated) and, the sending entity 108 can be a client or a server, and the receiving entity 104 can be a server. The delay component 112 facilitates the storage of at least two copies of the message 110 until the message 110 is successfully delivered by the receiving entity 104 to a next receiving entity (not shown).

The delay component 112 can delay transmission of the acknowledgement 114 to the sending entity 108 until successful delivery of the message 110 from the receiving entity 104 to a downstream entity (not shown). The delay component 112 can also delay transmission of the acknowledgement 114 to the sending entity 108 until after a delayed acknowledgement timeout but before a timeout at the sending entity 108. Additionally, the delay component 112 can delay transmission of the acknowledgement 114 to the sending entity 108 until after a timeout at the sending entity 108. Note that a timeout on the sending entity 108 means that an administrator needs to re-configure the system with a smaller delayed acknowledgement timeout.

Additionally, when processing a message, there is a class of messages referred to as side-effect messages, which can be generated by the messaging server, and which no other messaging servers are aware. Accordingly, such side effect messages at each messaging server are vulnerable to loss in case of server failure. Examples of side effect messages include, but are not limited to, non-delivery reports (NDRs), delivery status notifications (DSNs), agent generated messages, journaling reports, etc. The disclosed architecture also supports the high availability of side effect messages as well.

A list of delayed acknowledgement messages is periodically checked and the messages processed that are to be timed out are removed them from the list. The corresponding command objects are then triggered to issue an end-of-data (EOD) acknowledgement. When a message is timed out, a value in a performance counter (used to track non-redundant messages as a parameter related to exposure to data loss) is incremented and the counter is decremented when the delivered event is received and not found in a not-yet-timed-out list. In case of a server restart, the delayed acknowledgement messages that were not fully delivered and acknowledged are resent by the sending server. In the mean time, the current server continues with the delivery.

Delayed acknowledgement messages can be marked, and the delivery status of such messages and associated side effects are tracked. When a delayed acknowledgement message is fully delivered and a notification is sent, the message can be looked up in a set of pending delayed acknowledgement messages. If the message exists, then the message will be removed and the acknowledgement is triggered via a command object. If not found, then the delayed acknowledgment for this message has timed out, and hence, nothing will be done.

Figure 2:
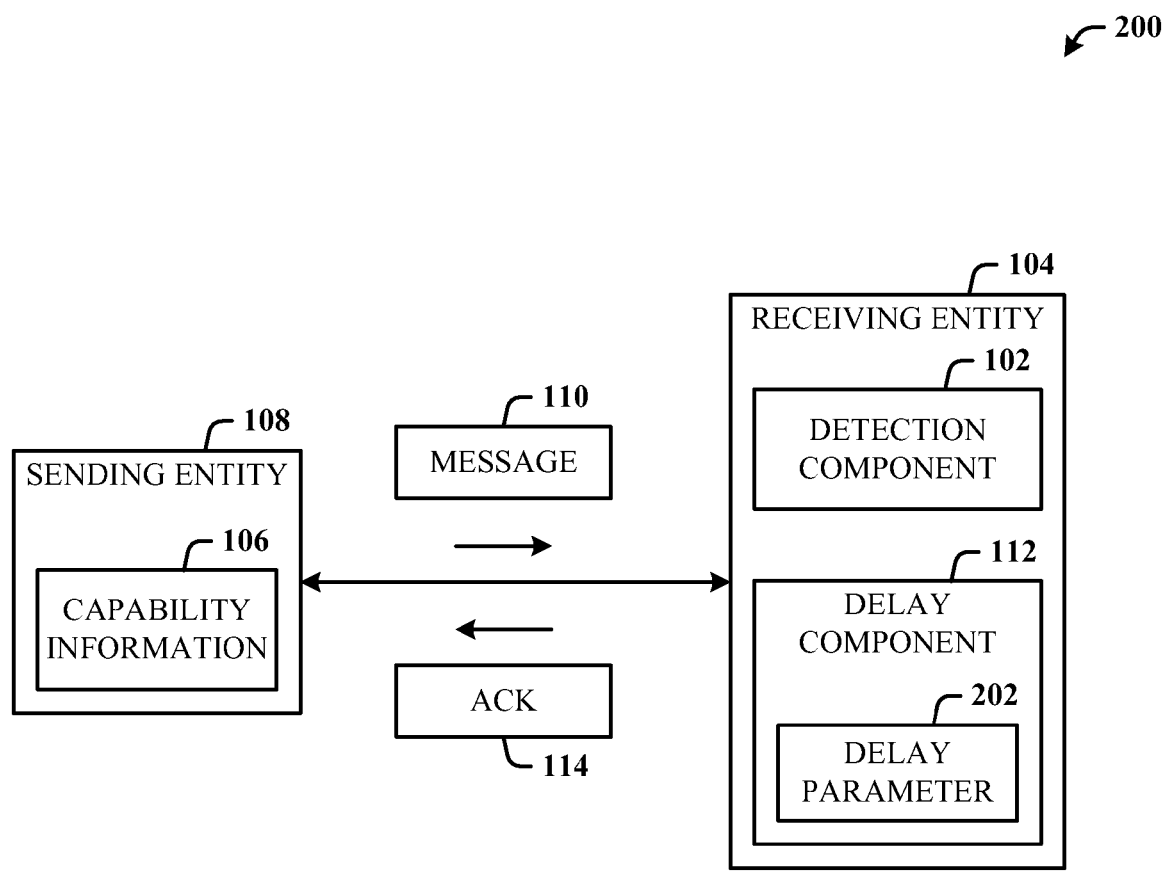
FIG. 2 illustrates an alternative embodiment of a system where the delay component includes a tunable delay parameter.

FIG. 2 illustrates an alternative embodiment of a system 200 where the delay component 112 includes a tunable delay parameter 202. The delay parameter 202 defines how long the delay component 112 will wait before transmission of the acknowledgement 114. The delay parameter can be tuned to delay transmission of the acknowledgement 114 according to a specified delay time based on a percentage of messages that have been successfully delivered in the past when using the specified delay time.

Figure 3:
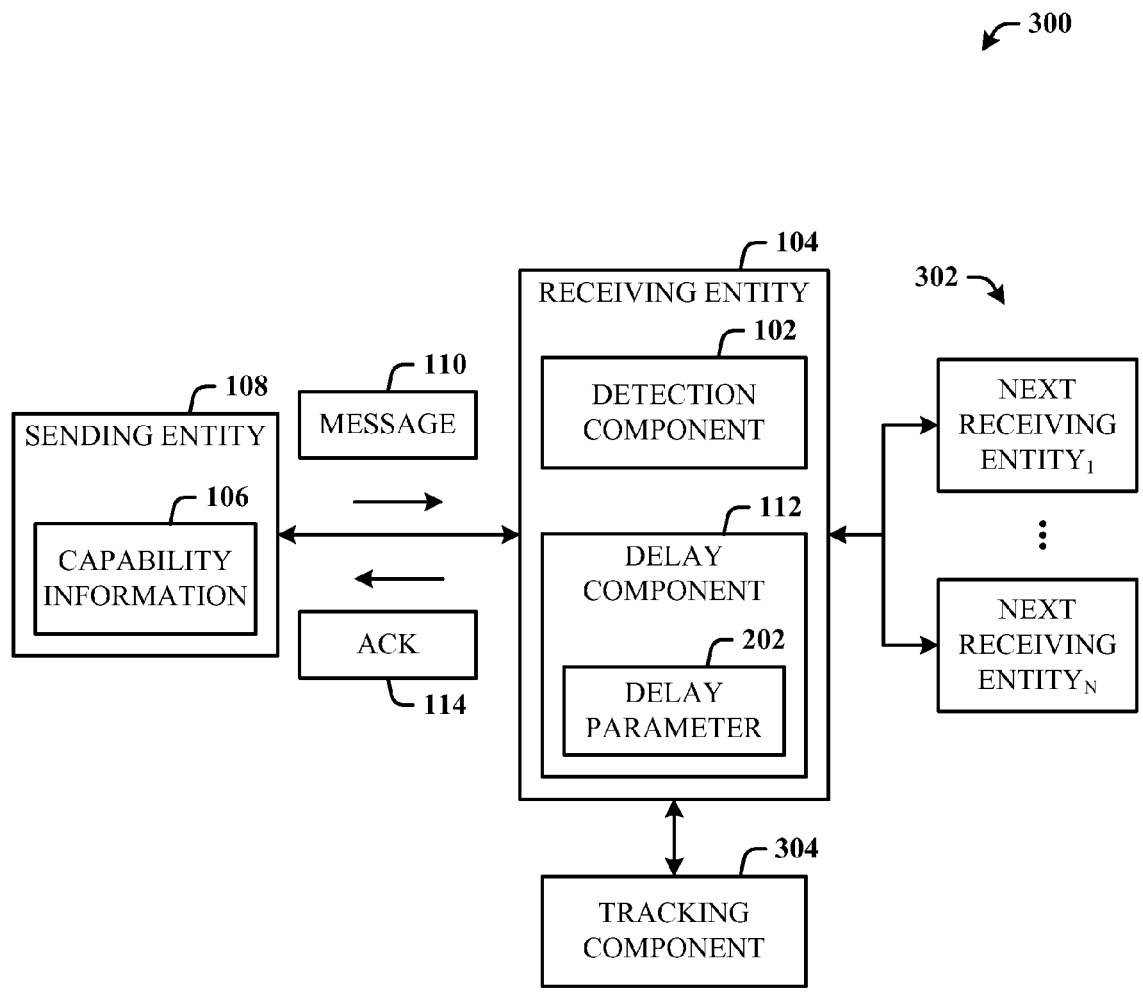
FIG. 3 illustrates a system where ownership of the message is delayed until delivery is to all next recipient entities.

FIG. 3 illustrates a system 300 where ownership of the message 110 is delayed until delivery is to all next recipient entities 302. In support thereof, the system 300 further includes a tracking component 304 that tracks whether the message 110 has been delivered to all of the next recipient entities 302. Note that as illustrated, the tracking component 304 is external to, but associated with, the receiving entity 104. It is to be understood, however, that alternatively, the tracking component 304 can be internal to the receiving entity 104. Here, the message 110 is sent to multiple recipients. In a message handling system, the receiving entity 104 can further pass the message 110 to next recipient entities 302 (denoted Next Recipient Entity$_1$, . . . , Next Recipient Entity$_N$), also referred to as the next hops. In this embodiment, the acknowledgement 114 will only be sent to the sending entity 108 when the message 110 has been successfully delivered to all of the next recipient entities 302, as tracked by the tracking component 304.

Figure 4:
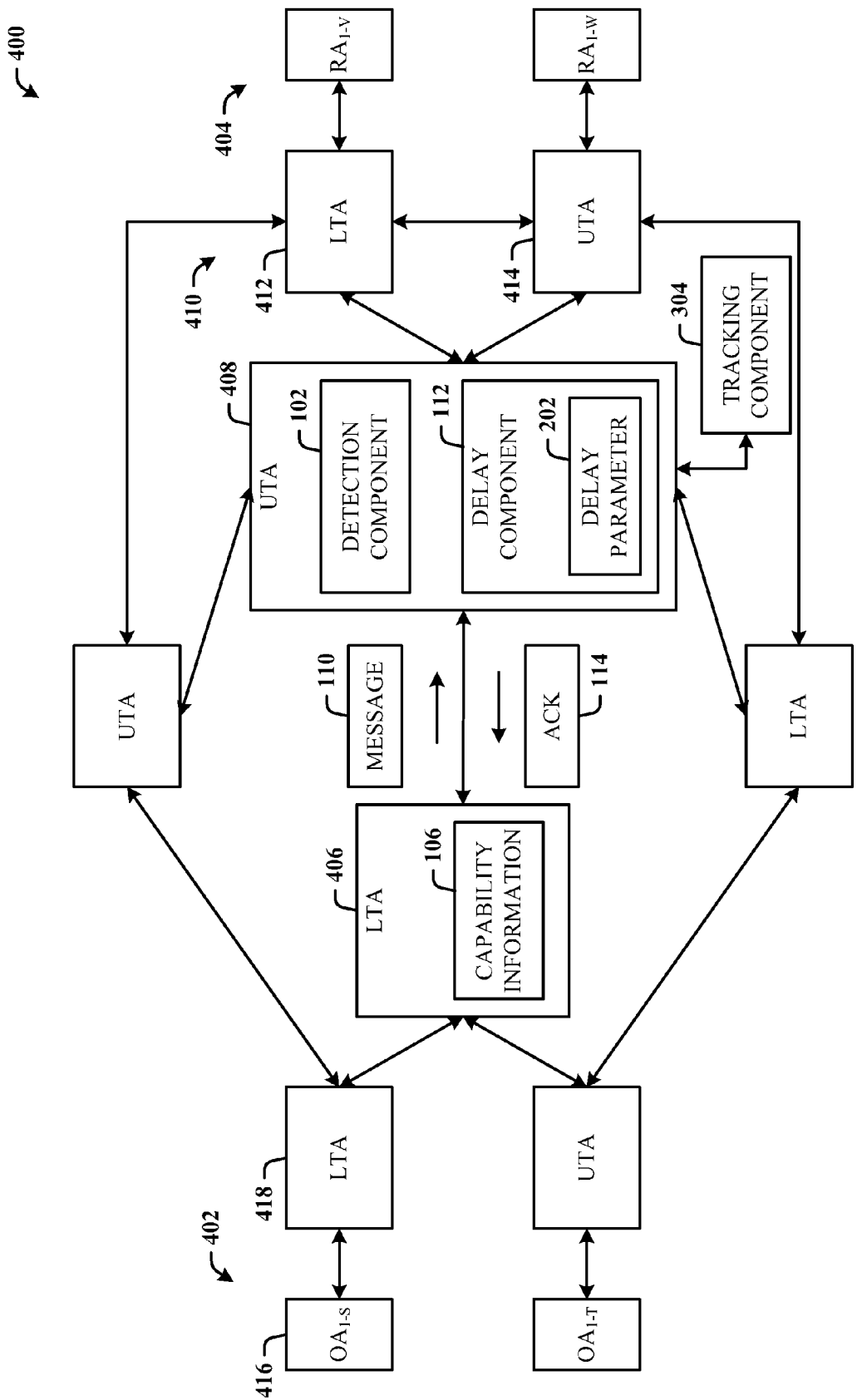
FIG. 4 illustrates a message system using message transfer agents in accordance with the disclosed architecture.

FIG. 4 illustrates a message system 400 using message transfer agents in accordance with the disclosed architecture. The system 400 includes one or more legacy transfer agents (LTAs) for transferring messages between originating user agents (OAs) 402 (denoted OA$_{1-S}$ and OA$_{1-T}$) and recipient user agents (RAs) 404 (denoted RA$_{1-V}$ and RA$_{1-W}$), and one or more updated transfer agents (UTAs) in communication with the one or more LTAs for transferring messages between the OAs 402 and the RAs 404. The system 400 can include any combination of LTAs and UTAs.

The one or more UTAs each include the detection component 102 for detecting legacy capabilities of sending LTAs from which a message is received. Each UTA also includes the delay component 112 for delaying transmission of the acknowledgement (ACK) 114 to the sending LTA based on the legacy capabilities.

For example, a sending LTA 406 includes the capabilities information 106 that indicates that the sending LTA 406 is a legacy transfer agent that lacks the updates to operate optimally with a receiving UTA 408. The LTA 406 receives the message 110 from one of the OAs 402. The UTA 408 detects the capability information 106 for the sending LTA 406 and determines that delay acknowledgment of the acknowledgement 114 to the sending LTA 406 will be utilized to provide the message redundancy high availability transport desired. Note that the inter-connections illustrated between the LTAs and the UTAs are just one example of the inter-connections that can be employed between transfer agents in a message handling system.

The delay component 112 facilitates redundant storage of the message 110 until the message 110 is successfully delivered to at least one of immediate legacy or updated transfer agents 410. The delay component 112 can include the tunable delay parameter 202 that defines a wait time before the delayed transmission of the acknowledgement 114 to the sending LTA 406. The wait time can be derived based on a percentage of messages that have been successfully delivered when using the wait time. For example, if a specific wait time is associated with successful delivery of ninety-five percent of the messages, the delay parameter 202 can be set to achieve this success.

The delay component 112 can be configured to delay transmission of the acknowledgement 114 to the sending LTA 406 until successful delivery of the message from the UTA 408 to at least one of an immediate LTA 412 or an immediate UTA 414, the successful delivery tracked by the tracking component 304. The delay component 112 can also delay transmission of the acknowledgement 114 to the sending LTA 406 until after a delayed acknowledgement timeout or until after a timeout at the sending LTA 406.

The delayed acknowledgement 114 is sent when the receiving UTA 408 receives and takes ownership of the message 110 only after the message 110 is delivered to all next hops (e.g., one or more of the LTA 412 or the UTA 414).

An administrator can tune the level of redundancy by tuning the amount of time before which the UTA 408 accepts responsibility of the message 110. That is, tuning is performed such that most of the messages will be delivered below the threshold where the clients time out and without the senders timing out. This can be a small duration (e.g., thirty seconds) where a high percentage of the messages may be delivered, or it can be configured to a high value where the next hops will timeout and re-send at a later time. Note that the disclosed architecture is not limited to email messages, but can be applied to any redundant messaging systems when dealing with legacy systems.

It can be the case where the message 110 is sent from an originating user of the OAs 416 such that the message 110 is sent through LTAs, and acknowledgements are delayed through more than one LTA, for example a first LTA 418 and the sending LTA 406, such that associated acknowledgements are delayed.

Figure 5:
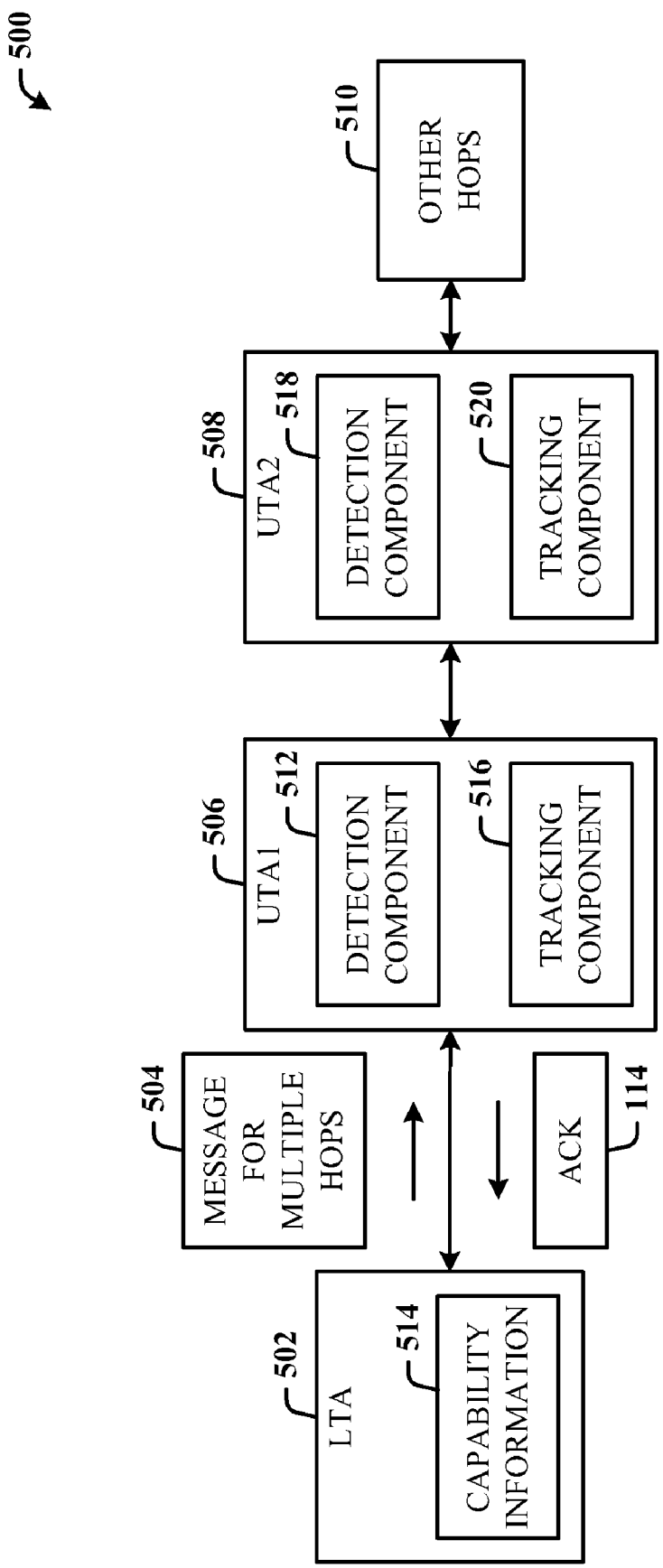
FIG. 5 illustrates a more generalized system that employs delayed acknowledgement.

FIG. 5 illustrates a more generalized system 500 that employs delayed acknowledgement. Here, a legacy transport LTA 502 sends a message 504 (destined to multiple hops) to an updated transport UTA1 506 (having transport high availability with delayed acknowledgement capability). The UTA1 506 relays the message 504 to updated transport UTA2 508 using native transport high availability. The LTA 502 receives the delayed acknowledgement 114 for the message 504, since the message 504 now exists on multiple servers (e.g., UTA1 506 and UTA2 508). The UTA2 508 delivers the message 504 to all other hops 510 and confirms delivery to the UTA1 506. This reduces the cases where the delayed acknowledgement is performed based on timeout, since delivery is only to one destination, a destination that is local and available, rather than potential delivery to multiple destinations, some of which may be remote/unavailable, thereby causing a timeout.

The UTA1 506 can also include a detection component 512 for detecting (by advertising and not receiving any indication that the LTA 502 is capable of native transport high availability) capability information 514 of the LTA1 502. Additionally, the UTA1 506 can include a tracking component 516 for tracking delivery of the message 504 to a next hop (e.g., the UTA2 508). Similarly, the UTA2 508 can include a detection component 518 for detecting capabilities of the previous hop (the UTA1 506) for native transport high availability, and a tracking component 520 for tracking delivery of the message 504 to the other hops 510.

It can be the case where LTAs can have an alternative mechanism for providing message redundancy, or not have an alternative mechanism for providing message redundancy, in which case, the LTA can choose opt-in via an opt-in component 502 to participate in the delayed acknowledgement architecture. In other words, if the sending LTA 406 does not include an alternative redundancy mechanism, the sending LTA 406 can opt-in to use delayed acknowledgment, as described herein. In such cases, the detection component 102 can receive control information from the sending LTA 406 (the sending entity) that allows the sending LTA 406 to opt-in of delayed transmission of the acknowledgement 114.

The opt-in functionality allows for managing the possible decrease delivery latency over data redundancy when resource constraints exist. This means that redundancy can be disabled in order to minimize degradation of service during excessive resource consumption.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
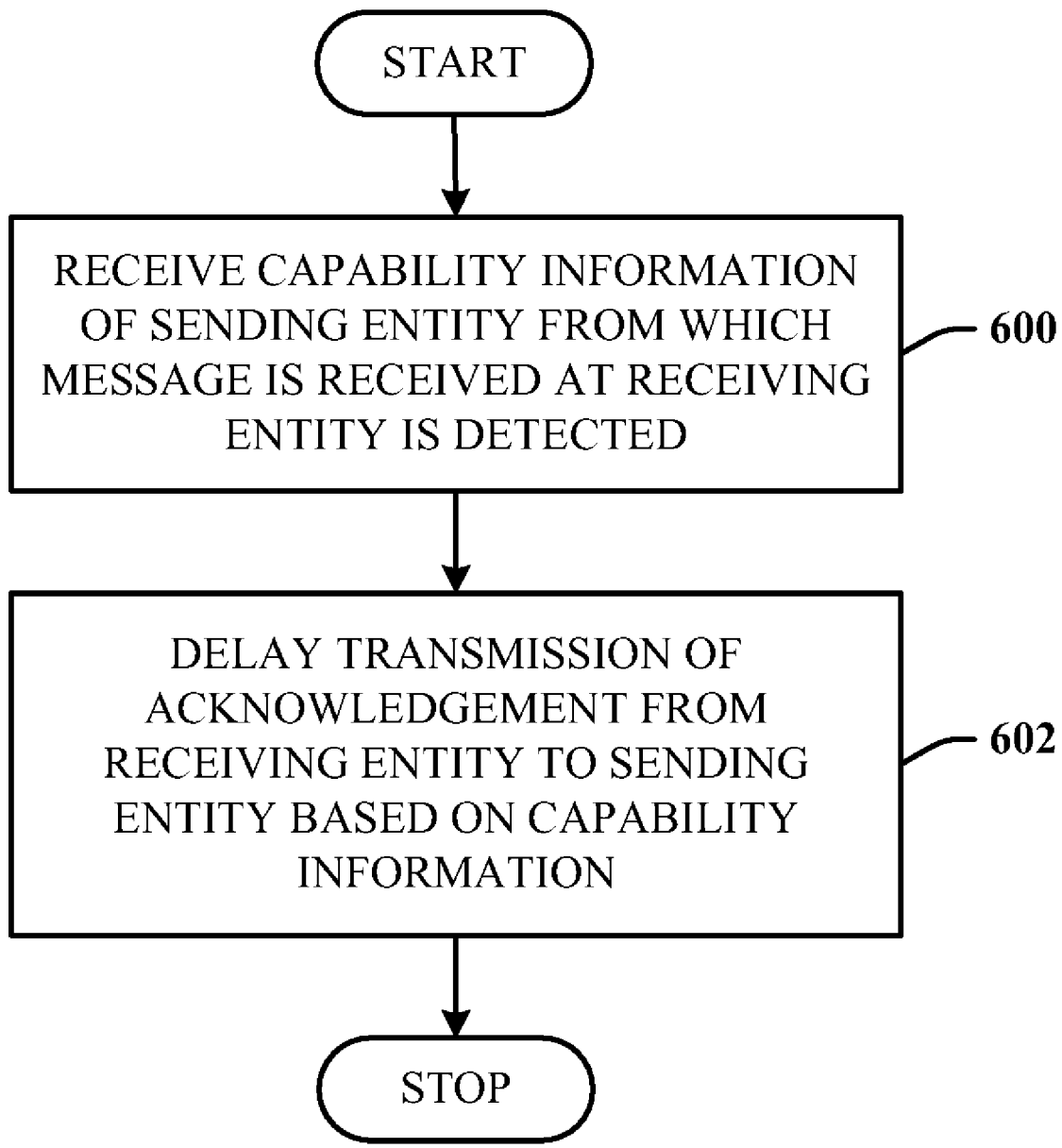
FIG. 6 illustrates a method of processing messages.

FIG. 6 illustrates a method of processing messages. At 600, capability information of a sending entity from which a message is received at a receiving entity is detected. At 602, transmission of an acknowledgement from the receiving entity to the sending entity is delayed based on the capability information. As is described herein below, the method can further comprise delaying the acknowledgement according to an adjustable delay parameter, and delaying transmission of the acknowledgement to the sending entity until successful delivery of the message from the receiving entity to a next receiving entity.

The method can further comprise delaying transmission of the acknowledgement to the sending entity until after a delayed acknowledgement timeout but before a timeout at the sending entity. The method can further comprise delaying ownership of the message until the message is delivered to all of next hops.

The method can further comprise advertising transport high availability capability information to a sending entity, receiving capability information from the sending entity related to transport high availability capability, and employing delayed transmission of the acknowledgement to the sending entity based on not opting-in to the transport high availability capability.

Figure 7:
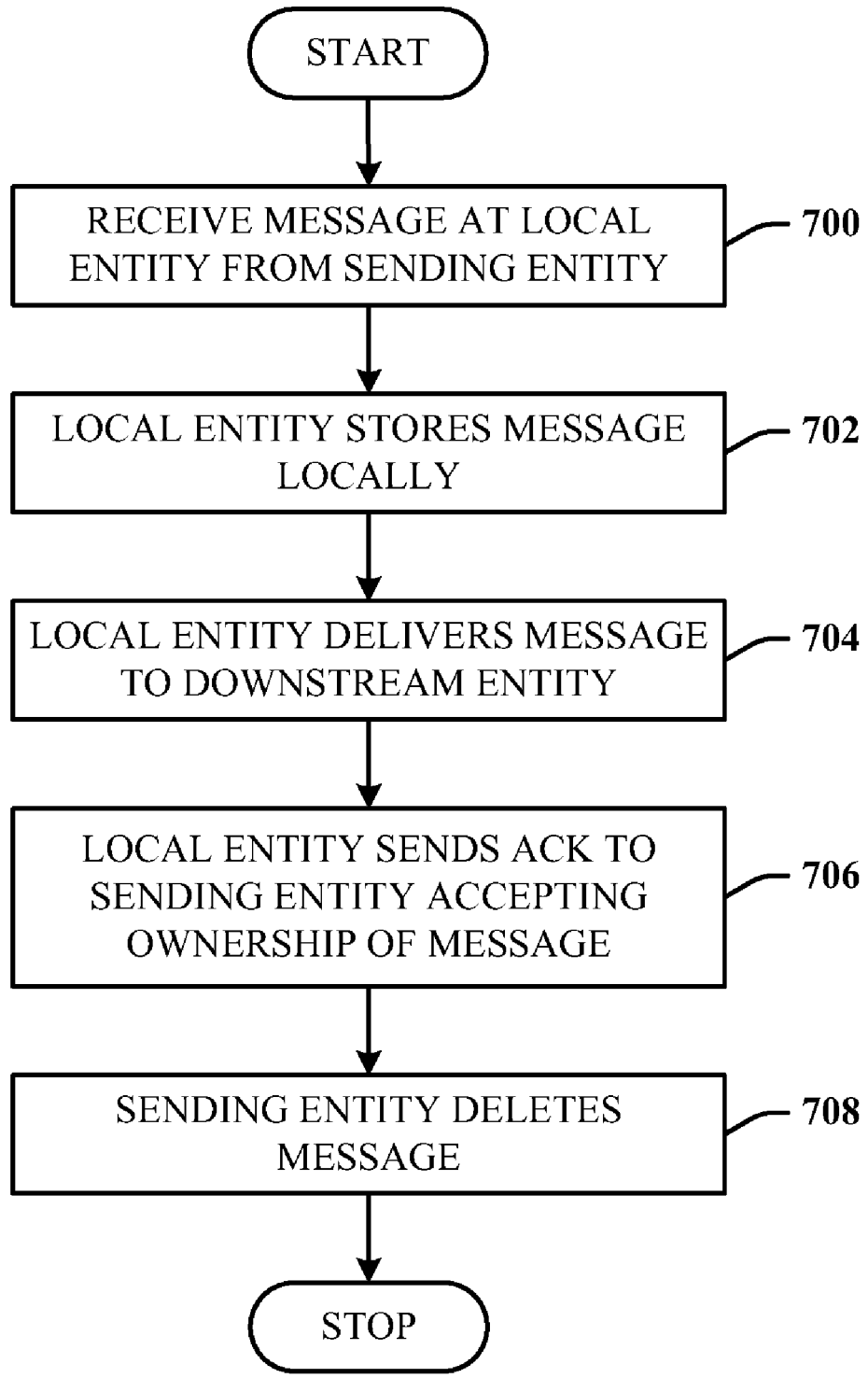
FIG. 7 illustrates a method of processing delayed acknowledgment delivery before timeout of the delayed acknowledgement.

FIG. 7 illustrates a method of processing delayed acknowledgment delivery before timeout of the delayed acknowledgement. At 700, a message is received at a local entity from a sending entity. At 702, the local entity stores the message locally. At 704, the local entity delivers the message to a downstream entity. At 706, the local entity sends an ACK to the sending entity accepting ownership of the message. At 708, the sending entity deletes the message.

Figure 8:
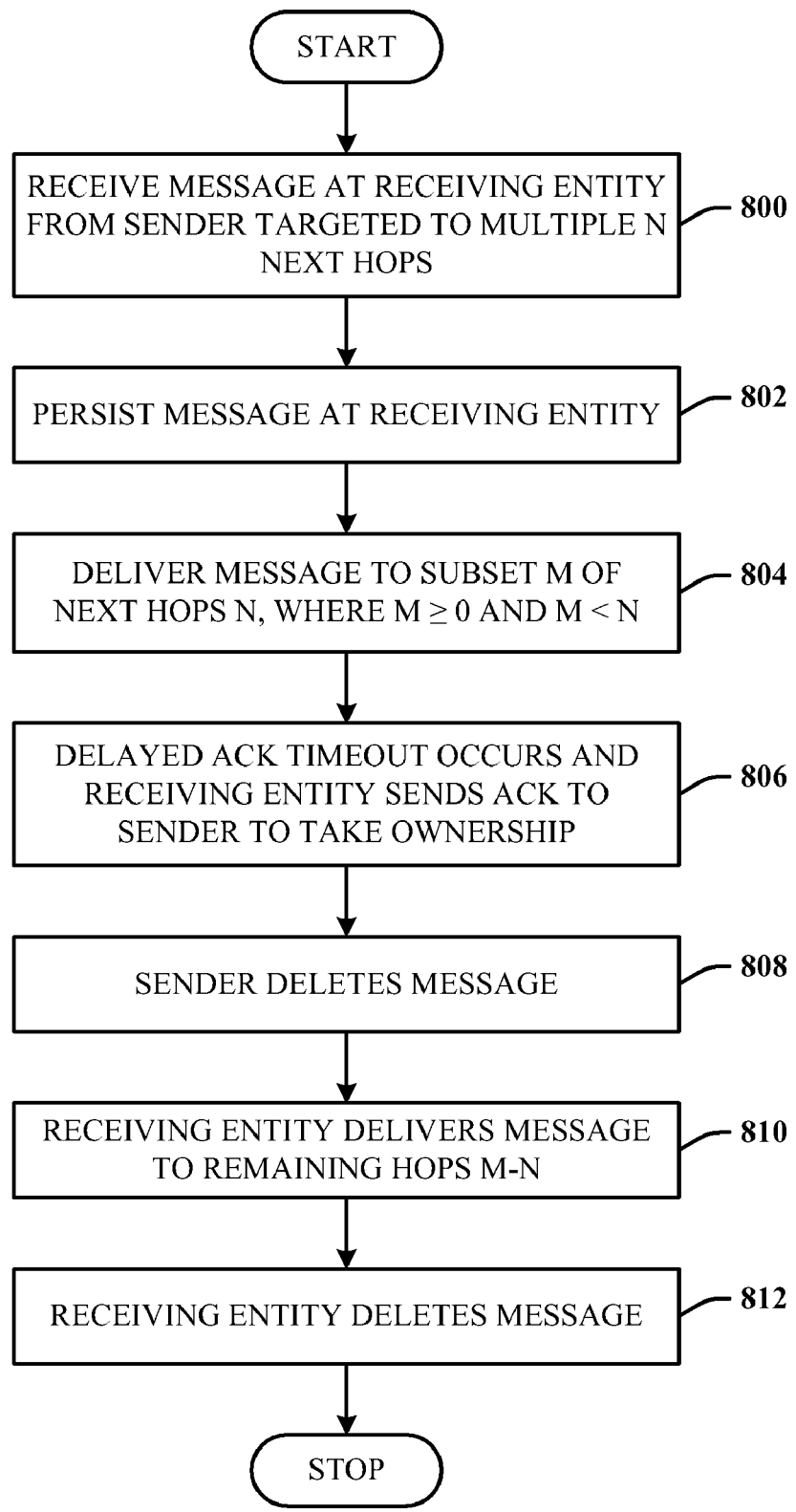
FIG. 8 illustrates a method of processing delayed acknowledgment delivery after timeout of the delayed acknowledgement and before timeout of the sending entity.

FIG. 8 illustrates a method of processing delayed acknowledgment delivery after timeout of the delayed acknowledgement and before timeout of the sending entity. At 800, a message is received at a receiving entity from a sender that is targeted to multiple N next hops. At 802, the message is persisted at the receiving entity. At 804, the message is delivered to a subset M of the next hops N, where $M \geq 0$ and $M<N$. At 806, delayed acknowledge timeout occurs and the receiving entity sends an acknowledgement to the sender indicating ownership of the message. At 808, the sender deletes the message. The message is no longer redundant. At 810, the receiving entity delivers the message to the remaining next hops N-M. At 812, the message is deleted from the receiving entity. Note that deletion of the receiving entity copy of the message depends on the redundancy between the receiving entity server and the following servers. This applies to delayed acknowledgement or transport high availability.

Figure 9:
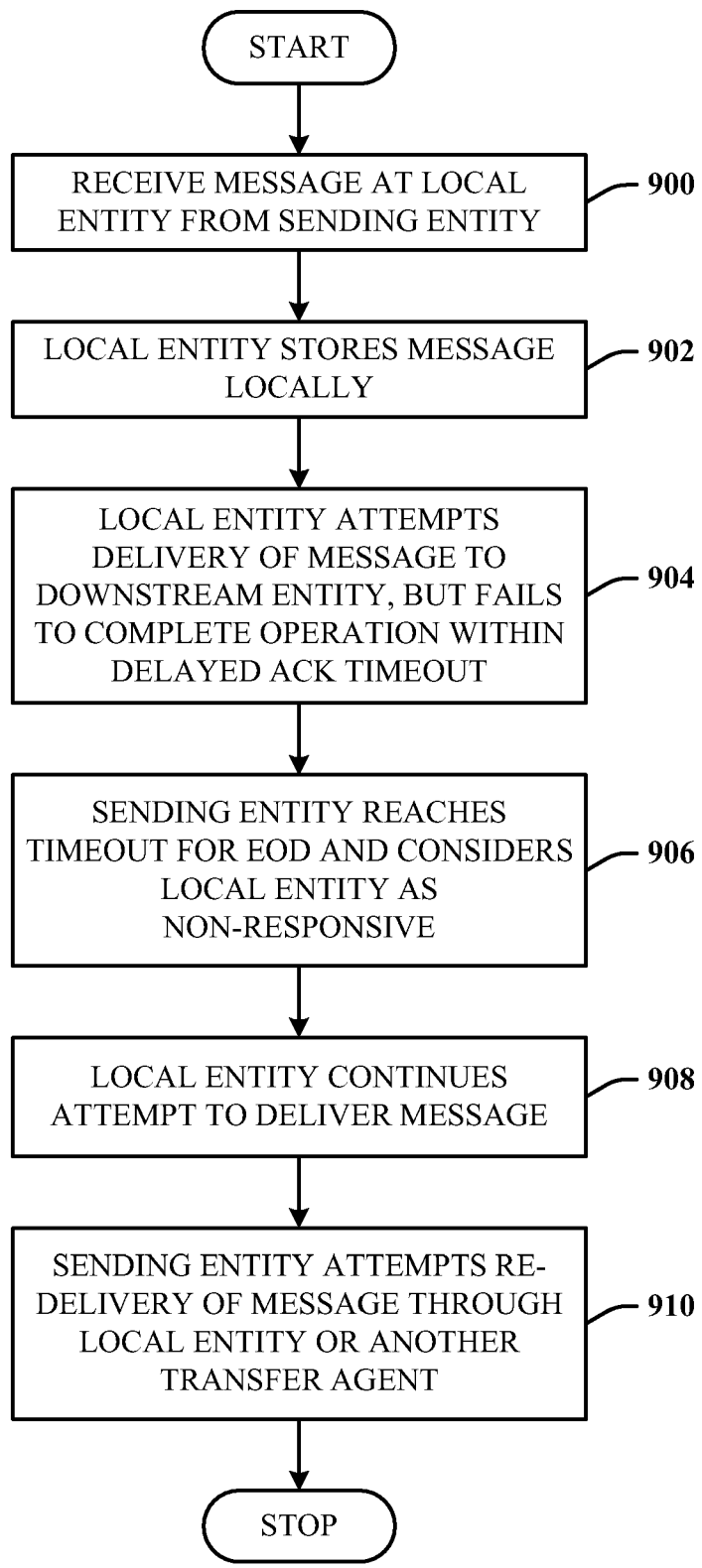
FIG. 9 illustrates a method of processing delayed acknowledgment delivery after timeout of the sending entity.

FIG. 9 illustrates a method of processing delayed acknowledgment delivery after timeout of the sending entity. At 900, a message is received at a local entity from a sending entity. At 902, the local entity stores the message locally. At 904, the local entity attempts delivery of the message to a downstream entity, but fails within the delayed acknowledgement timeout. At 906, the sending entity reaches a timeout for end-of-data (EOD) and considers the local entity as non-responsive. At 908, the local entity continues attempted delivery of the message. At 910, the sending entity attempts re-delivery of the message through the local entity or another transfer agent.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
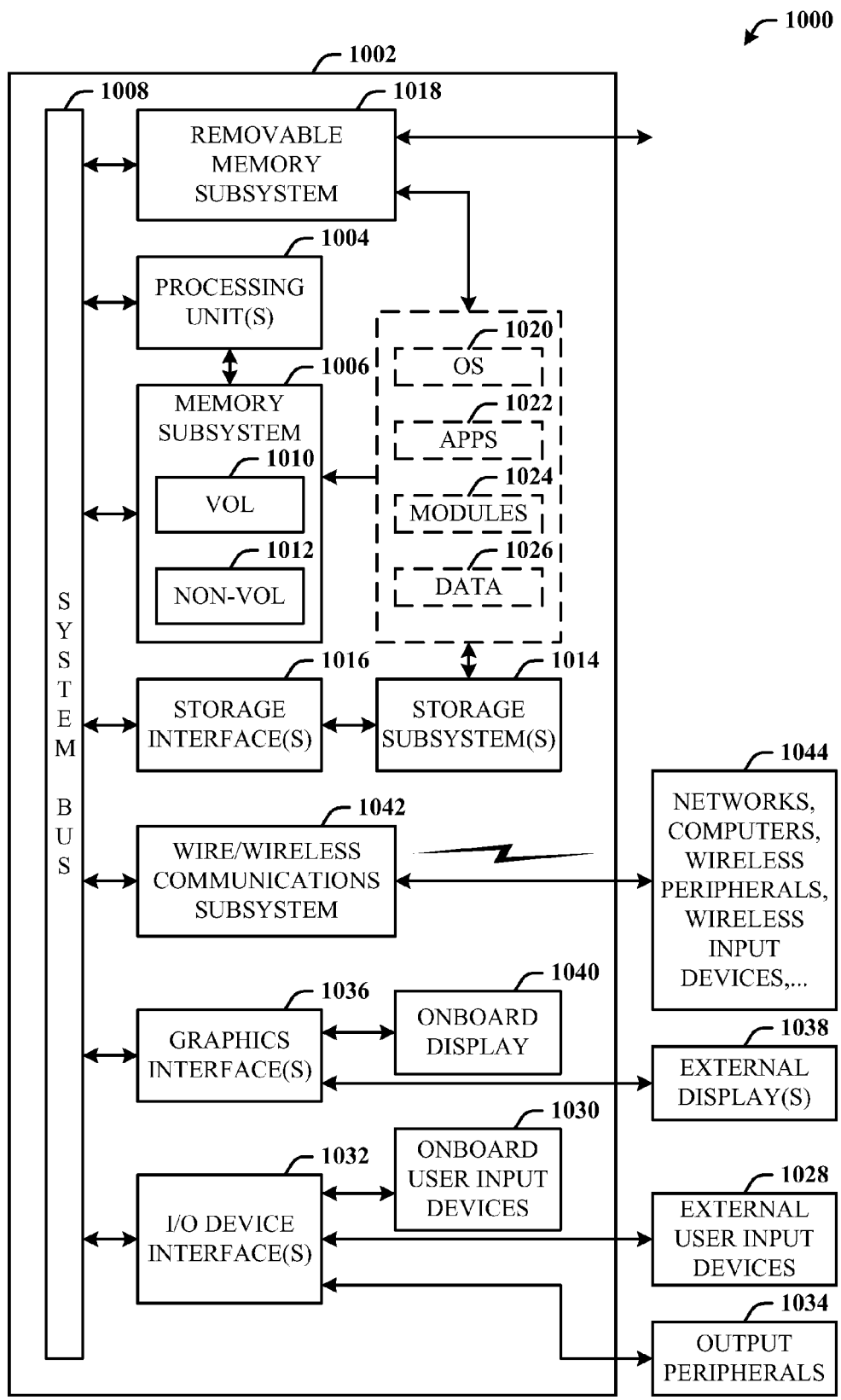
FIG. 10 illustrates a block diagram of a computing system operable to provide high availability transport of messages in accordance with the disclosed architecture.

Referring now to FIG. 10, there is illustrated a block diagram of a computing system 1000 operable to provide high availability transport of messages in accordance with the disclosed architecture. In order to provide additional context for various aspects thereof, FIG. 10 and the following discussion are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the memory subsystem 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes storage subsystem(s) 1014 and storage interface(s) 1016 for interfacing the storage subsystem(s) 1014 to the system bus 1008 and other desired computer components. The storage subsystem(s) 1014 can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a removable memory subsystem 1018 (e.g., flash drive form factor technology), and/or the storage subsystem(s) 1014, including an operating system 1020, one or more application programs 1022, other program modules 1024, and program data 1026. Generally, programs include routines, methods, data structures, other software components, etc., that perform particular tasks or implement particular abstract data types.

Where all or portions of the computer 1002 are messaging employed as a server, the one or more application programs 1022, other program modules 1024, and program data 1026, can include the detection component 102, the delay component 112, the capability information 106, the delay parameter 202, the tracking component 304, and the methods of FIGS. 6-9, for example. Where the computer 1002 is a server, the one or more application programs 1022, other program modules 1024, and program data 1026 can include the other comments, agents and entities described herein relative to servers, for example.

All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Computer readable media can be any available media that can be accessed by the computer 1002 and includes volatile and non-volatile media, removable and non-removable media. For the computer 1002, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP) using logical connections via a wired/wireless communications subsystem 1042 to one or more networks and/or other computers. The other computers can include workstations, servers, routers, personal computers, microprocessor-based entertainment appliance, a peer device or other common network node, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or has other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented messaging system, comprising:
   a detection component of a receiving entity for detecting capability information of a sending entity from which a message has been received at the receiving entity, the capability information indicating whether the sending entity is a legacy sending entity;
   a delay component for delaying transmission of an acknowledgement from the receiving entity to the sending entity based on the capability information, wherein the delay component delays indicating to the sending entity that the sending entity may delete the sending entity's copy of the message until the message is delivered successfully by the receiving entity to a next receiving entity; and
   a processor implementing one or both of the detection component and the delay component.

2. The system of claim 1, wherein the sending entity is a legacy sending entity, and the sending entity is a client or a server and the receiving entity is a server.

3. The system of claim 1, wherein the delay component includes a tunable delay parameter that defines how long the delay component will wait before transmission of the acknowledgement.

4. The system of claim 3, wherein the delay parameter is tuned to delay transmission of the acknowledgement according to a specified delay time based on a percentage of messages that have been successfully delivered in the past when using the specified delay time.

5. The system of claim 1, wherein the delay component delays transmission of the acknowledgement to the sending entity until successful delivery of the message from the receiving entity to a downstream entity.

6. The system of claim 1, wherein the delay component delays transmission of the acknowledgement to the sending entity until after a delayed acknowledgement timeout but before a timeout at the sending entity.

7. The system of claim 1, further comprising a tracking component for tracking delivery of the message to all next hops.

8. The system of claim 1, wherein the detection component receives control information from the sending entity that allows the sending entity to opt-in to native transport high availability or automatically receive delayed transmission of the acknowledgement.

9. A computer-implemented messaging system, comprising:
  one or more legacy transfer agents for transferring messages between originating user agents and recipient user agents; and
  one or more updated transfer agents in communication with the one or more legacy transfer agents for transferring messages between the originating user agents and recipient user agents, the one or more updated transfer agents each including:
    a detection component for detecting legacy capabilities of a sending legacy transfer agent from which a message is received, the legacy capabilities indicating that the sending legacy transfer agent is a legacy transfer agent;
    a delay component for delaying transmission of an acknowledgement to the sending legacy transfer agent based on the legacy capabilities, wherein the delay component delays indicating to the sending legacy transfer agent that the sending legacy transfer agent may delete the sending legacy transfer agent's copy of the message until the message is successfully delivered to all immediate legacy or updated transfer agents; and
    a tracking component for tracking delivery of the messages to a next set of hops; and
    a processor implementing one or more of the one or more legacy transfer agents or the one or more updated transfer agents.

10. The system of claim 9, wherein the delay component includes a tunable delay parameter that defines a wait time before the delayed transmission of the acknowledgement, the wait time is derived based on a percentage of messages that have been successfully delivered when using the wait time.

11. The system of claim 9, wherein the delay component delays transmission of the acknowledgement to the sending legacy transfer agent until successful delivery of the message from the updated transfer agent to all immediate legacy or updated transfer agents.

12. The system of claim 9, wherein the detection component receives control information from a sending agent indicating that the sending agent opts-in to native transport high availability or automatically receives delayed transmission of the acknowledgement.

13. A computer-implemented method of processing messages, comprising:
  detecting, by a processor, capability information of a sending entity from which a message is received at a receiving entity, the capability information indicating whether the sending entity is a legacy sending entity; and
  delaying transmission of an acknowledgement from the receiving entity to the sending entity based on the capability information, wherein indicating to the sending entity that the sending entity may delete the sending entity's copy of the message is delayed until successful delivery of the message from the receiving entity to a next receiving entity.

14. The method of claim 13, further comprising delaying the acknowledgement according to an adjustable delay parameter.

15. The method of claim 13, further comprising delaying transmission of the acknowledgement to the sending entity until after a delayed acknowledgement timeout but before a timeout at the sending entity.

16. The method of claim 13, further comprising:
  advertising transport high availability capability information to a sending entity;
  receiving capability information from the sending entity related to transport high availability capability; and
  employing delayed transmission of the acknowledgement to the sending entity based on not opting-in to the transport high availability capability.

17. The method of claim 13, further comprising delaying ownership of the message until the message is delivered to all of next hops.

* * * * *